(12) United States Patent
You

(10) Patent No.: US 8,868,895 B2
(45) Date of Patent: Oct. 21, 2014

(54) METHOD AND APPARATUS TO DISPLAY ON DISPLAY UNIT BY DETERMINING AMOUNT OF DATA BEING STREAMED TO THE DISPLAY UNIT DURING INITIALIZATION PROCESS

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 181 days.

(21) Appl. No.: 13/285,017

(22) Filed: Oct. 31, 2011

(65) Prior Publication Data

US 2012/0290825 A1 Nov. 15, 2012

(30) Foreign Application Priority Data

May 10, 2011 (CN) .......................... 2011 1 0119661

(51) Int. Cl.
*G06F 9/00* (2006.01)
*G06F 15/177* (2006.01)
*G06F 3/14* (2006.01)
(52) U.S. Cl.
CPC ............ *G06F 3/14* (2013.01); *G09G 2330/026* (2013.01)
USPC .......................................................... 713/2

(58) Field of Classification Search
CPC ... G06F 9/4401; G06F 9/4406; G06F 9/4416; G06F 11/1417; G06F 9/4403
USPC .............................................................. 713/2
See application file for complete search history.

(56) References Cited

U.S. PATENT DOCUMENTS

| 5,799,204 | A  | * | 8/1998  | Pesto, Jr. ........................ 710/10 |
| 6,343,196 | B1 | * | 1/2002  | Yun et al. ........................ 399/81 |
| 6,473,855 | B1 | * | 10/2002 | Welder .............................. 713/2 |
| 6,993,645 | B2 | * | 1/2006  | Joseph et al. ..................... 713/2 |
| 8,502,827 | B1 | * | 8/2013  | Herz .............................. 345/501 |
| 2006/0077201 | A1 | * | 4/2006 | Shen ............................. 345/213 |

* cited by examiner

*Primary Examiner* — Thomas Lee
*Assistant Examiner* — Lin Lin Htay
(74) *Attorney, Agent, or Firm* — Novak Druce Connolly Bove + Quigg LLP

(57) ABSTRACT

An electronic device includes a first processor, a second processor for detecting the working state of the electronic device in real time, a storage unit for storing preset information and a display unit. The second processor determines that the electronic device has entered the hardware initialization process and displays the preset information. The second processor stops displaying the preset information on the display unit when the hardware initialization process is determined to be finished. A booting method for starting an electronic device is also provided.

6 Claims, 3 Drawing Sheets

METHOD AND APPARATUS TO DISPLAY ON DISPLAY UNIT BY DETERMINING AMOUNT OF DATA BEING STREAMED TO THE DISPLAY UNIT DURING INITIALIZATION PROCESS

BACKGROUND

1. Technical Field

The present disclosure relates to electronic devices and, particularly, to an electronic device capable of showing users' desired or favorite information during the boot-up period of the electronic device and a method thereof.

2. Description of Related Art

During the booting up of computers, users cannot view any interface or input any information into the computers except for entering and viewing the BIOS or a test interface. For some computers the boot time is too long, thus the users may feel bored and become impatient during the booting-up process.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
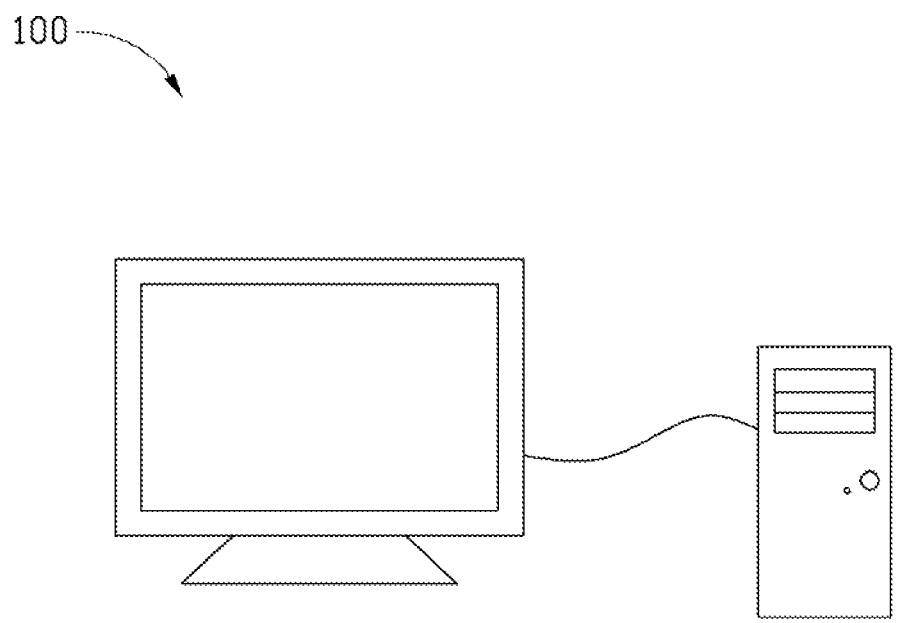
FIG. 1 is a schematic view of an electronic device in accordance with an embodiment.
Figure 2:
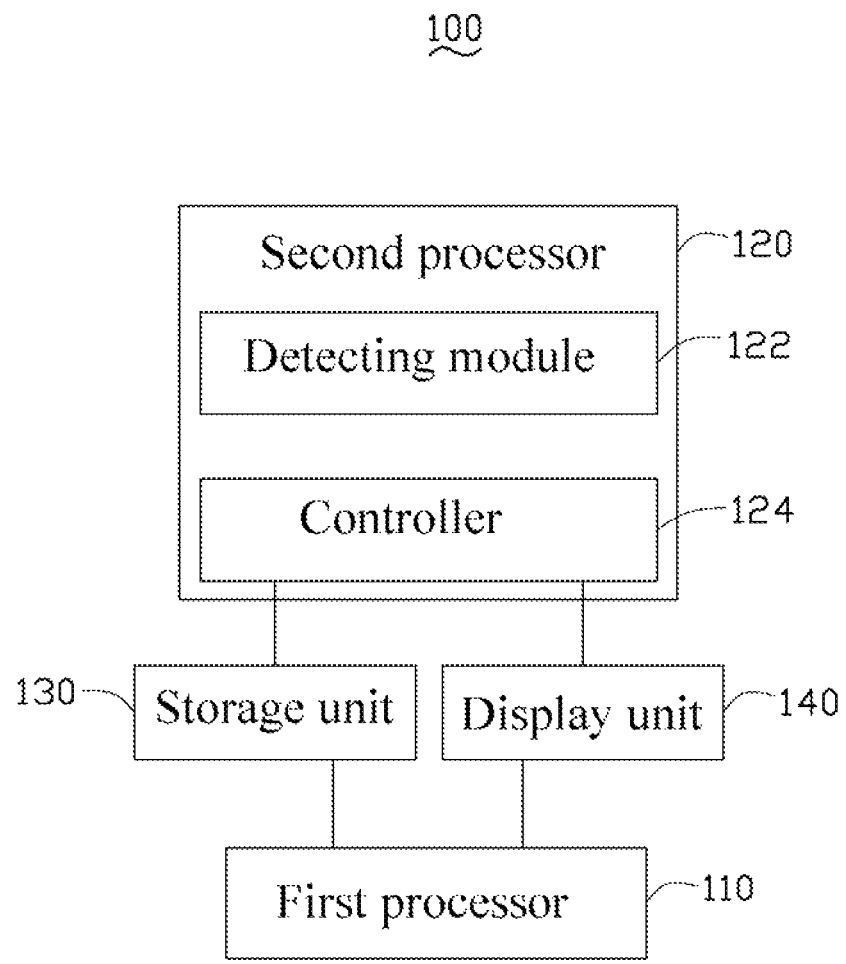
FIG. 2 is a block diagram of the electronic device of FIG. 1, in accordance with an embodiment.

Referring to FIGS. 1 and 2, an embodiment of an electronic device 100 is illustrated. The electronic device 100 may be a desktop computer, a laptop computer, or a tablet computer. In this embodiment, the electronic device 100 can display an interface during the boot-up period of the electronic device 100, to display users' desired or favorite information.

The electronic device 100 is electrically connected to an external power supply (not shown) through a power wire (not labeled). The electronic device 100 includes a first processor 110, a second processor 120, a storage unit 130, and a display unit 140. The electronic device 100 further includes other hardware, for example, a motherboard (not shown), and a hard disc (not shown). The first processor 110 is a central processing unit (CPU). When a power button (not shown) of the electronic device 100 is pressed, the external power supply provides power to the mother board and the other hardware of the electronic device 100. The supply voltage may not be stable at the beginning of the boot-up process, thus the mother board will keep transmitting a reset signal to the CPU. When the supply voltage becomes stable, the mother board stops transmitting the reset signal to the CPU, and the electronic device 100 enters the hardware initialization process. During initializing, the size or quantity of the data stream of initialization information displayed on the display unit 140 is far less than the amount of data for a background or desktop picture displayed on the display unit 140 when the electronic device 100 has finished the hardware initialization process. Therefore, in this embodiment, the electronic device 100 can determine that when it has entered the hardware initialization process (that is when the CPU is no longer receiving a reset signal), and may also determine that the electronic device 100 has finished the hardware initialization process (when the electronic device 100 determines that the amount of data being streamed to the display unit 140 is greater than a predetermined value).

In this embodiment, the storage unit 130 stores preset information, for example, the favorite pictures of a user. The second processor 120 includes a detecting module 122 and a controller 124. The detecting module 122 instantaneously detects the working state of the electronic device 100. When the detecting module 122 detects that the electronic device 100 has entered the hardware initialization process, the controller 124 obtains the preset information from the storage unit 130 and displays the preset information on the display unit 140. When the detecting module 122 detects that the electronic device 100 has finished the hardware initialization process, the controller 124 releases the display unit 140, and the first processor 110 displays a background or desktop image on the display unit 140. As described above, in this embodiment, when the detecting module 122 detects a reset signal, the second processor 120 may determine that the electronic device 100 has entered the hardware initialization process. When the detecting module 122 detects that the amount of data being streamed to the display unit 140 is greater than a predetermined value, the second processor 120 may determine that the electronic device 100 has finished the hardware initialization process. In an alternative embodiment, when the detecting module 122 determines that a certain variation of the amount of data being streamed to the display unit 140 has taken place, the second processor 120 may determine that the electronic device 100 has finished the hardware initialization process.

Figure 3:
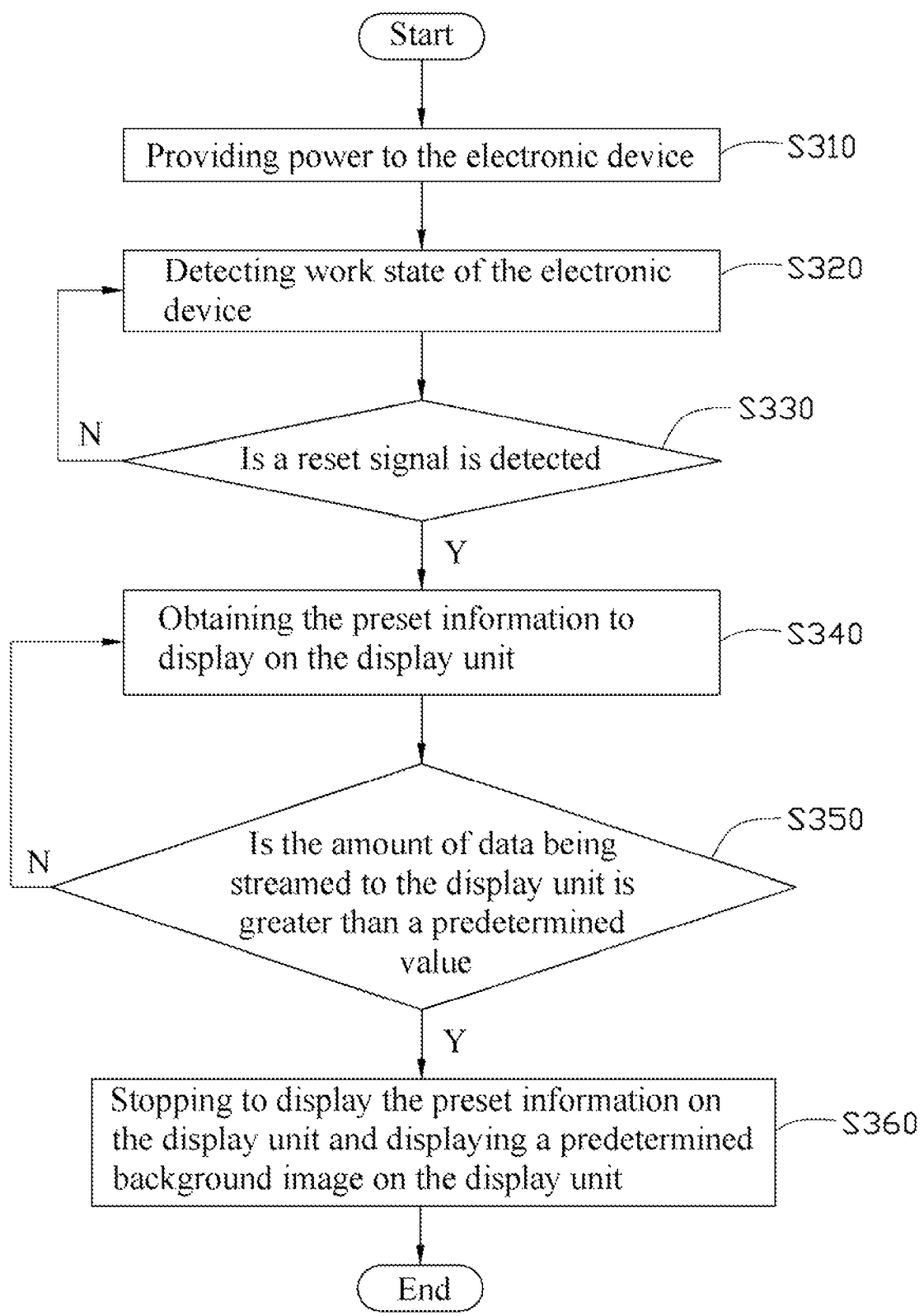
FIG. 3 is a flowchart of a booting method for starting the electronic device of FIG. 1, in accordance with an embodiment.

Referring to FIG. 3, a booting method for starting an electronic device 100 is provided. The method includes the following steps:

In step S310, the external power supply provides power to the electronic device 100.

In step S320, the detecting module 122 instantaneously detects the working state of the electronic device 100.

In step S330, the detecting module 122 detects a reset signal. When the detecting module 122 detects a reset signal, the procedure goes to step S340. Until the detecting module 122 detects a reset signal, the procedure returns to step S320.

In step S340, the controller 124 obtains the preset information stored in the storage unit 130 and displays it.

In step S350, the detecting module 122 further determines whether the amount of data being streamed to the display unit 140 is greater than a predetermined value. If the amount is greater than the predetermined value and the procedure goes to S360; if the amount is not more than the predetermined value, the procedure returns to S340.

In step S360, the controller 124 stops displaying the preset information on the display unit 140 by releasing the unit 140, and the first processor 110 may display a background or desktop image on the display unit 140.

With the assistance of the electronic device 100 and the booting method for starting the electronic device 100 applied therein, a desirable and selected interface is provided so the user can view favorite information during the boot-up time of the electronic device 100, thus providing some functionality to avoid boredom or impatience.

Although the present disclosure has been specifically described on the basis of the exemplary embodiment thereof, the disclosure is not to be construed as being limited thereto.

Various changes or modifications may be made to the embodiment without departing from the scope and spirit of the disclosure.

What is claimed is:

1. An electronic device, comprising:
    a first processor;
    a second processor for detecting an initialization process of the electronic device at a given time;
    a storage unit for storing a preset information and a background picture; and
    a display unit;
    wherein the second processor obtains the preset information in the storage unit to display on the display unit when the electronic device enters the hardware initialization process, and stops displaying the preset information on the display unit when the amount of data being streamed to the display unit exceeds a predetermined value, and the first processor displays the background image on the display unit when the amount of data being streamed to the display unit exceeds a predetermined value.

2. The electronic device of claim 1, wherein the second processor determines that the electronic device enters the hardware initialization process when detecting a reset signal.

3. The electronic device of claim 2, wherein the second processor determines that the hardware initialization process is finished when detecting that the amount of data being streamed to the display unit is greater than a predetermined value.

4. The electronic device of claim 1, wherein the second processor comprises a detecting unit for detecting the work state of the electronic device, and a controller for obtaining the preset information to display on the display unit when the detecting unit determines that the electronic device enters the hardware initialization process and for stopping to display the preset information on the display unit when the hardware initialization process is determined to be finished.

5. A booting method for starting an electronic device, the method comprising:
    detecting an initialization process of the electronic device at a given time;
    obtaining a preset information to display on the display unit when determining that the electronic device enters the hardware initialization process; and
    stopping the display of the preset information on the display unit and displaying a background picture on the display unit when the amount of data being streamed to the display unit exceeds a predetermined value.

6. The method as claimed in claim 5, wherein the electronic device enters the hardware initialization process when detecting a reset signal.

* * * * *